United States Patent
Gourevitch et al.

(10) Patent No.: US 10,541,957 B2
(45) Date of Patent: *Jan. 21, 2020

(54) USING E-MAIL MESSAGE CHARACTERISTICS FOR PRIORITIZATION

(71) Applicant: Microsoft Technology Licensing, LLC, Redmond, WA (US)

(72) Inventors: Gregory Gourevitch, Redmond, WA (US); Todd Luttinen, Redmond, WA (US); Victor Boctor, Redmond, WA (US); Wilbert De Graaf, Bellevue, WA (US); Lizhuang Zhao, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,626

(22) Filed: Jun. 13, 2018

(65) Prior Publication Data

US 2018/0295084 A1    Oct. 11, 2018

Related U.S. Application Data

(63) Continuation of application No. 15/438,414, filed on Feb. 21, 2017, now Pat. No. 10,021,055, which is a
(Continued)

(51) Int. Cl.
| | |
|---|---|
| *H04L 12/58* | (2006.01) |
| *H04L 12/26* | (2006.01) |
| *H04L 12/835* | (2013.01) |
| *G06Q 10/10* | (2012.01) |
| *H04L 12/927* | (2013.01) |
| *H04L 12/70* | (2013.01) |

(Continued)

(52) U.S. Cl.
CPC ............ *H04L 51/14* (2013.01); *G06Q 10/107* (2013.01); *H04L 43/16* (2013.01); *H04L 47/30* (2013.01); *H04L 51/12* (2013.01); *H04L 47/50* (2013.01); *H04L 47/805* (2013.01); *H04L 67/42* (2013.01); *H04L 2012/5681* (2013.01)

(58) Field of Classification Search
CPC .......... H04L 51/14; H04L 43/16; H04L 47/30
USPC ...................................................... 709/206
See application file for complete search history.

(56) References Cited

U.S. PATENT DOCUMENTS 6,157,614 A * 12/2000 Pasternak ........... H04L 12/5601
                                                    370/236
6,658,485 B1 * 12/2003 Baber .................... G06F 9/546
                                                    718/103
(Continued)

*Primary Examiner* — Minh Chau Nguyen

(57) ABSTRACT

Message prioritization may be provided. First, a message may be received and a priority level may be calculated for the message. If the message is not rejected for having a priority lower than a predetermined threshold, the message may be placed in a first priority queue. Next, the message may be de-queued from the first priority queue based upon the calculated priority level for the message. Distribution group recipients corresponding to the message may then be expanded and the priority level for the message may be re-calculated based upon the expanded distribution group recipients. Next, the message may be placed in a second priority queue. The message may then be de-queued from the second priority queue based upon the re-calculated priority level for the message and delivered.

20 Claims, 3 Drawing Sheets

Related U.S. Application Data continuation of application No. 12/962,697, filed on Dec. 8, 2010, now Pat. No. 9,589,254.

(51) Int. Cl.
*H04L 12/863* (2013.01)
*H04L 29/06* (2006.01)

(56) References Cited

U.S. PATENT DOCUMENTS

| | | | |
|---|---|---|---|
| 7,934,083 B2 * | 4/2011 | Taylor | G06F 21/10 |
| | | | 348/725 |
| 2004/0203615 A1 * | 10/2004 | Qu | H04M 1/663 |
| | | | 455/412.1 |
| 2005/0204009 A1 * | 9/2005 | Hazarika | G06Q 10/107 |
| | | | 709/206 |
| 2006/0017983 A1 * | 1/2006 | Syri | G06F 17/2715 |
| | | | 358/402 |
| 2009/0157834 A1 * | 6/2009 | Krishnaswamy | G06Q 10/10 |
| | | | 709/206 |

* cited by examiner

USING E-MAIL MESSAGE CHARACTERISTICS FOR PRIORITIZATION

CROSS-REFERENCE TO RELATED APPLICATIONS

This application is a continuation application of U.S. patent application Ser. No. 15/438,414 (now U.S. Pat. No. 10,021,055), entitled "USING E-MAIL MESSAGE CHARACTERISTICS FOR PRIORITIZATION," filed on Feb. 21, 2017, which application is a continuation application of U.S. patent application Ser. No. 12/962,697 (U.S. Pat. No. 9,589,254), filed on Dec. 8, 2010, the complete disclosures of which are hereby incorporated by reference in their entirety.

BACKGROUND

Within Internet message handling services, electronic mail messages are transferred from one computer to another using a client-server application architecture. When an e-mail server has to deal with bursts of e-mail traffic, it typically utilizes first in first out (FIFO) queuing to process messages in the order they are received. This may cause problems for the e-mail server. For example, a more active sender may cause messages from all other senders to be queued if FIFO were the only mechanism that determines the order and priority of message processing in the e-mail server.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Message prioritization may be provided. First, a message may be received and a priority level may be calculated for the message. If the message is not rejected for having a priority level lower than a predetermined threshold, the message may be placed in a first priority queue. Next, the message may be de-queued from the first priority queue based upon the calculated priority level for the message. Distribution group recipients corresponding to the message may then be expanded and the priority level for the message may be re-calculated based upon the expanded distribution group recipients. Next, the message may be placed in a second priority queue. The message may then be de-queued from the second priority queue based upon the re-calculated priority level for the message and delivered.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
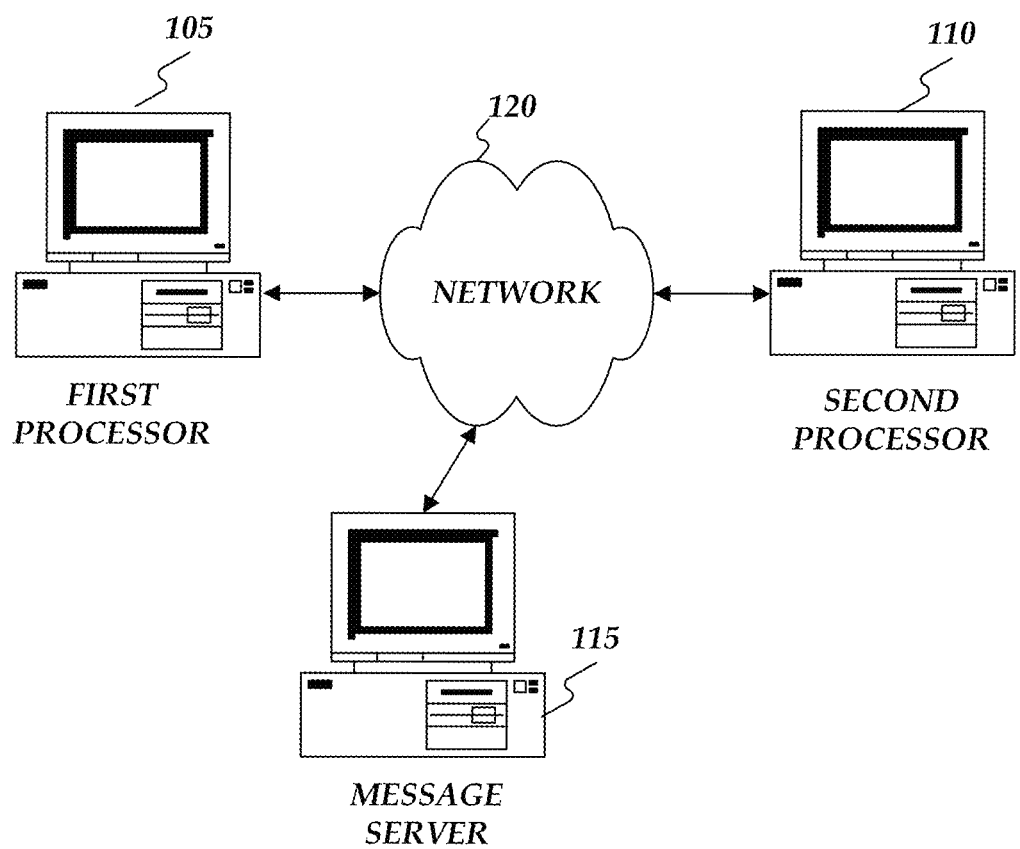
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

With conventional systems, prioritization of e-mail messages may be performed based on the "X-Priority:" MIME header that communicates a sender's prioritization intent to recipients and/or transmitting e-mail servers. While conventional e-mail servers may choose to honor such headers, in most cases it cannot be used to provide fair e-mail server resource allocation and processing order because: i) e-mail senders are not aware of other messages competing for server resources; and ii) in many cases e-mail senders cannot be trusted and may intentionally try to abuse the system.

When a conventional e-mail server has to deal with bursts of e-mail traffic and cannot immediately process all incoming messages in parallel, it typically utilizes FIFO queuing to process messages in the order they are received. However, in many cases the order of incoming messages does not translate to a fair allocation of e-mail server resources and the order of delivery. An example situation that may result in an unfair allocation may be when a very active sender causes messages from other senders to be queued behind his/her messages and thus consume disproportional amount of resources comparing to the other senders. Similarly, in a multi-tenant e-mail system, an e-mail traffic disparity between different tenants may result in unfair resource allocation between those tenants. Moreover, a larger message may take more resources than other messages or message with a specific type of attachment may be much more expensive to scan for viruses.

Consistent with embodiments of the invention, message priority based on various characteristics of the message may be calculated. Then the calculated priority may be used to determine the order of subsequent processing of the message relative to other messages to achieve a fair resource allocation across different users. The calculated priority may also be used to determine which messages to accept or reject in situations when the queuing capacity is reached.

Embodiments of the invention may use multiple priority queues and are not limited to just two priority queues. With these multiple priority queues, embodiments of the invention may process and re-prioritize a message multiple times before delivery or relay. For example, a message may come in as fresh, but get blocked on a server for a while and become stale. At one point, embodiments of the invention may lower the message's priority after it has gone in a second queue.

Consistent with embodiments of the invention, the number of priority queues, the number of re-prioritization states that take place, and the number of processing states may vary between different embodiments. For example, a message may go through N states of processing with M priority queues between those states and K "priority calculators". The N states of processing may comprise various different types of processing and are not limited to any particular type of processing. While embodiments of the invention are not so limited, one example may be the ability to calculate priority before SMTP response is sent out and making a decision on whether to accept or reject the message based on that priority.

FIG. 1 shows a messaging system 100 consistent with embodiments of the inventions. Messaging system 100 may comprise a first processor 105, a second processor 110, a message server 115, and a network 120. Message server 115 may facilitate the passage of messages (e.g. e-mail) between first processor 105 and second processor 110 over network 120. Any one of first processor 105, second processor 110, and message server 115 may comprise, but is not limited to, a desktop computer, a notebook computer, a mobile device, a smart telephone, or a personal digital assistant, for example. Network 120 may comprise the internet or any type network over which first processor 105, second processor 110, and message server 115 may communicate. Any one of first processor 105, second processor 110, and message server 115 may be implemented using, for example, a computing device 300 as described in greater detail below with respect to FIG. 3.

Message prioritization may be provided. Consistent with embodiments of the invention, a message transfer agent (MTA) may operate on message server 115 to facilitate the passage of messages (e.g. e-mail) between first processor 105 and second processor 110 over network 120. The MTA may calculate priority of a message based on various message characteristics such as sender, recipients, authentication level, message size, etc. The calculated priority may then be used by the MTA to prioritize further processing and delivery/relay of the message relative to other messages in the MTA's pipeline. The calculated priority can also be used as a reason to temporarily reject a given message, which may allow the MTA to allocate more resources to processing higher priority messages.

Consistent with embodiments of the invention, message priority may be calculated based on various message characteristics. The calculated message priority may then be used to determine the order (e.g. priority) of further processing and relay/delivery of the message. The calculated priority may also be used to decide whether to accept or reject the message. Embodiments of the invention may also include an extensibility model to allow custom classification algorithms to determine priorities. Moreover, embodiments of the invention may include a classification system that may be layered on top of priority queuing and health-based throttling (e.g. backpressure), where one layer can be changed independent of the others.

Figure 2:
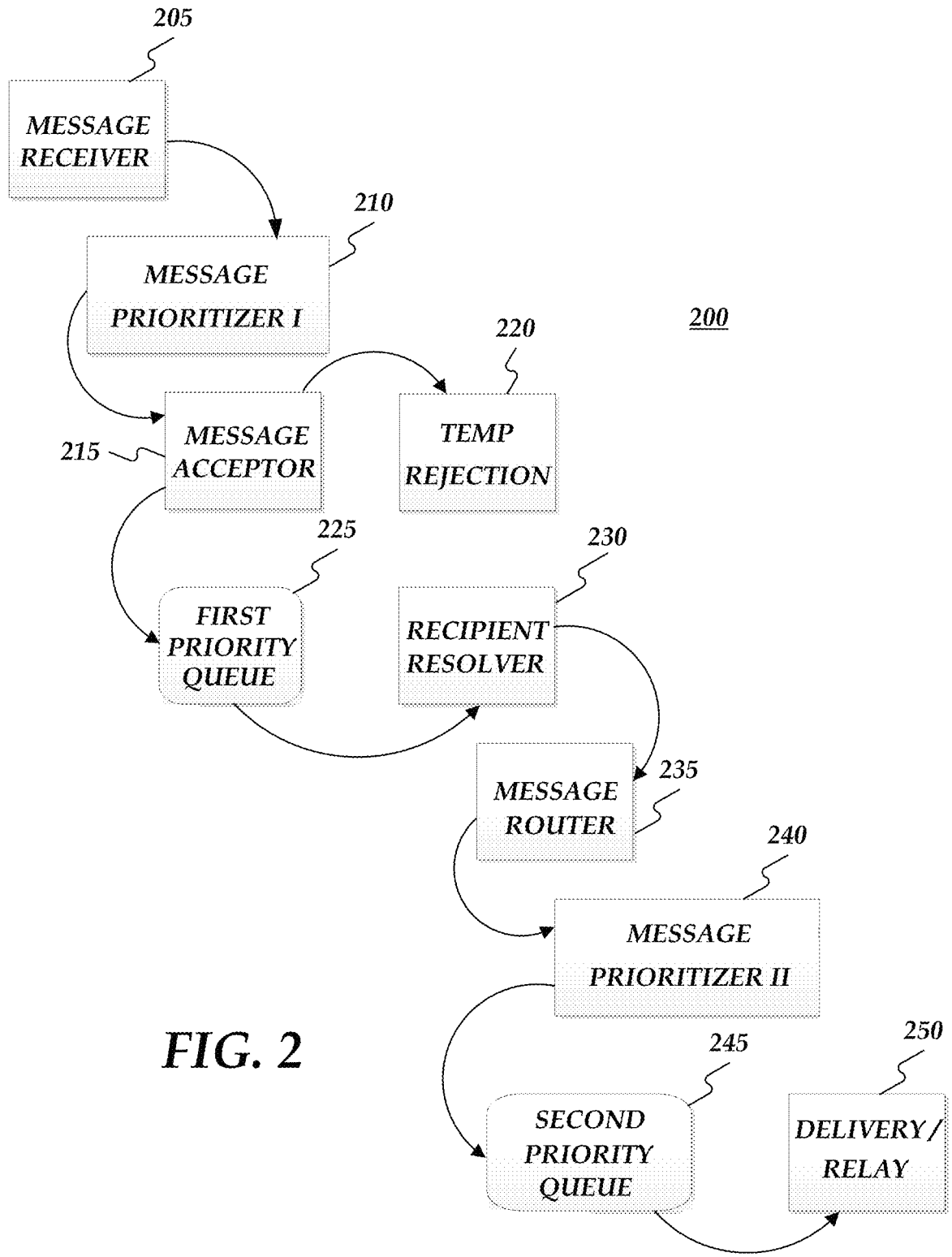
FIG. 2 is a state diagram of a method for providing prioritization.

FIG. 2 is a state diagram setting forth the general stages involved in a method 200 consistent with an embodiment of the invention for providing prioritization. Method 200 may be implemented using message server 115. A computing device 300, as described in more detail below with respect to FIG. 3, may be used as an operating environment for message server 115. Ways to implement the states of method 300 will be described in greater detail below.

As shown in FIG. 2, message server 115 may receive a message. (State 205.) The message may comprise an e-mail and may be received, for example, from first processor 105, second processor 110, or another e-mail server. For example, a user using a first e-mail client running on first processor 105 may wish to send the message to another user using a second e-mail client running on second processor 110. In order to achieve this, first processor 105 may send the message to message server 115 that may act as a message server for second processor 110.

After the message is received (state 205), message server 115 may calculate a priority level for the received message based on the received message's characteristics. (State 210.) The priority level for the received message may comprise any index by which messages may be proved with a priority level. For example, the message may be designated with a "high", "medium", or "low" priority level. The message may be given an index between 1 and 10 or between "A" and "Z". Notwithstanding, a priority level may be calculated and assigned to the received message. The calculated priority level may indicate the received message's priority.

The message's characteristics from which the priority level may be calculated may comprise, but are not limited to, direct characteristics and aggregated characteristics. Direct characteristics may comprise, but are not limited to, the message's size, the presence of a specific attachment type to the message, an authentication level of the message's sender, a number of recipients the message has, whether one of the recipients the message has is a distribution group, whether the message is "fresh" verses "delayed", or whether the message is being aggregated from a secondary account verses a regular message. Regarding the message's size direct characteristic, where the message is larger than a configurable threshold, the message may be assigned a lower priority. Regarding the message's "fresh" verses "delayed" direct characteristics, if the message was sent over a time period (e.g. 30 min.) ago, it may be marked as low priority. Another direct characteristic may comprise whether the message is associated with a user (e.g. sender and/or receiver) who is paying for the e-mail service or is receiving the e-mail service for free.

Aggregated characteristics may comprise, for example, a sender threshold. The sender threshold may comprise, but is not limited to, a number of recipients, a number of messages sent, and a total size of messages sent, for example. In this case, when a specific sender reaches a threshold on the number of messages submitted to message server 115 over a time period (e.g. the last minute), all other messages from the sender may be assigned a lower priority until the sender becomes inactive for some period of time. Other examples of the aggregated characteristics may comprise: i) tenant organization activity in a given time interval in a multi-tenant e-mail system; ii) aggregated usage of a specific resource by a sender/tenant; and iii) number of messages recently delivered to recipients of the message. A tenant organization activity may comprise an e-mail service for multiple organizations is hosted in a cloud. In this situation, the same set of hardware and other resources may be shared between those organizations.

Once the priority of a message has been determined, it can be used by message server 115 in states of method 200 in cases when message server 115 may not have enough resources to process all messages in parallel. Such subsequent states may comprise, but not limited to, distribution group expansion (e.g. state 230), rules and policy enforcement, delivery to mailboxes, or relay to other servers. The resource allocation across different messages may be based on the accuracy of priority calculation in addition to the order the messages may have been received by message server 115.

Once the priority for the received message is calculated (state 210), message server 115 may decide whether to accept or temporarily reject the message. (State 215.) The decision whether to accept or temporarily reject the message may be based on the calculated priority and the current queuing capacity/resource usage. For example, message server 115 may calculate the message priority before the message is fully accepted from first processor 105. In this case message server 115 may make a decision on whether to accept the message based on the priority. When SMTP protocol is used for message transmission, such priority calculation may be done any time before message server 115 sends a response to the SMTP DATA command (or the last chunk of ESMTP BDAT command for example). This approach may be used when message server 115 has utilized certain percentages of its queuing capacity. For example, message server 115 may start temporarily rejecting (e.g. 4XX SMTP response code) (state 220) Low priority messages when it uses over 60% of its queuing capacity and start temporarily rejecting (state 220) Normal priority messages when it reaches 80% of its queuing capacity. If message server 115 accepts (and does not temporarily reject) the message, the message may be accepted and placed on a first priority queue. (State 225.) If the calculated priority level is too low, message server 115 may decide to not accept the message from the sending MTA/client (e.g. that is, reject the message). It may then be up to the sending MTA/client to handle, for example, the SMTP protocol reject and depending on the error code, provide a temporary hold and/or other alternatives.

After the message is placed on the first priority queue (state 225), message server 115 may de-queue the message from the first priority queue. The order by which message server 115 de-queues the message may be priority-aware and may not be strictly FIFO. For example, all the messages in the first priority queue may be assigned a priority level based upon based on the messages' characteristics. (State 210.) Message server 115 may de-queue the messages with a higher priority level before it de-queue the messages with a lower priority level. Within messages having the same priority level, FIFO may be applied.

Once dequeued, message server 115 may process the message by expanding any distribution group recipients the message may have. (State 230.) After the message is processed (state 230), message server 115 may determine message destinations for delivery/relay based, for example, on recipient addresses. (State 235.) Next, message server 115 may re-calculate the priority based, for example, on the recipient changes made when message server 115 expanded (state 230) any distribution group recipients. (State 240.) The priority may be re-calculated multiple times as the message is transformed by different states in message server 115. For example, a distribution group expansion may increase the number of recipients of the message. The number of recipients may be a characteristic that affects prioritization. Consequently, the message's priority may be recalculated after the distribution group expansion in state 230. This group expansion may be one example of what can affect the priority of messages in-flight and embodiments of the invention are not so limited.

Once message server 115 re-calculates the priority (state 240), message server 115 may place the message on a second priority queue for delivery/relay. (State 245.) This is another place where the order of further processing may be influenced by the priority and is not strictly FIFO.

After message server 115 places the message on the second priority queue (state 245), message server 115 may de-queue the message from the second priority queue. As described above, the order of de-queuing may be priority-aware and may not be strictly FIFO. Once de-queued, the message may be delivered/relayed to its destinations. (State 250.)

An embodiment consistent with the invention may comprise a system for providing prioritization. The system may comprise a memory storage and a processing unit coupled to the memory storage. The processing unit may be operative to receive a message, calculate a priority level for the message, and place the message in a first priority queue. Moreover, the processing unit may be operative to de-queue the message from the first priority queue based upon the calculated priority level for the message and expand distribution group recipients corresponding to the message. Furthermore, the processing unit may be operative to re-calculate the priority level for the message based upon the expanded distribution group recipients and place the message in a second priority queue. In addition, the processing unit may be operative to de-queue the message from the second priority queue based upon the re-calculated priority level for the message and deliver the message.

Another embodiment consistent with the invention may comprise a system for providing prioritization. The system may comprise a memory storage and a processing unit coupled to the memory storage. The processing unit may be operative to calculate a priority level for a message. The calculated priority level for the message may be based upon at least one of the following: direct characteristics of the message and aggregated characteristics of the message. Furthermore, the processing unit may be operative to place the message in a priority queue. In addition, the processing unit may be operative to de-queue the message from the priority queue based upon the calculated priority level for the message and deliver the message.

Yet another embodiment consistent with the invention may comprise a system for providing prioritization. The system may comprise a memory storage and a processing unit coupled to the memory storage. The processing unit may be operative to calculate a priority level for a message. The calculated priority level for the message may be based upon at least one direct characteristic of the message or at least one direct aggregated characteristic of the message. Moreover, the processing unit may be operative to place the message in a first priority queue and to de-queue the message from the first priority queue based upon the calculated priority level for the message. Furthermore, the processing unit may be operative to expand distribution group recipients corresponding to the message and to re-calculate the priority level for the message based upon the expanded distribution group recipients. In addition, the processing unit may be operative to place the message in a second priority queue, de-queue the message from the second priority queue based upon the re-calculated priority level for the message, and to deliver the message.

Figure 3:
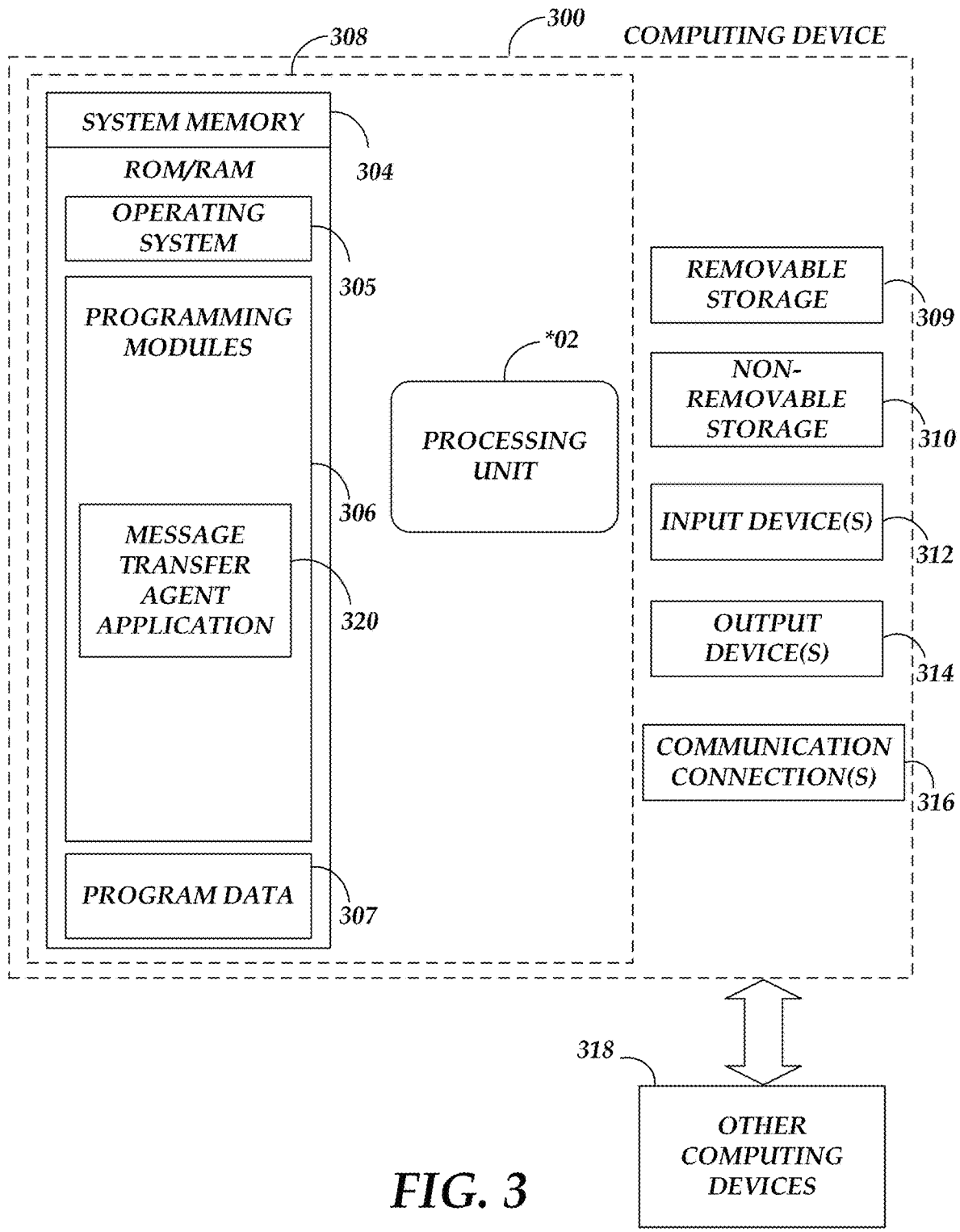
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention.

Furthermore, computing device 300 may comprise an operating environment for message server 115 as described above. Message server 115 may operate in other environments and is not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include a program data 307. Operating system 305, for example, may be suitable for controlling computing device 300's operation. In one embodiment, programming modules 306 may include, for example, a message transfer agent application 320. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g. message transfer agent application 320) may perform processes including, for example, one or more method 200's stages (i.e. states) as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing prioritization, the method comprising:
   receiving a message;
   calculating a priority level for the message;
   in response to determining that the calculated priority level of the message does not fall below a threshold, placing the message in a first priority queue;
   de-queuing the message from the first priority queue in an order based upon the calculated priority level for the message, wherein messages having higher calculated priority levels are de-queued from the first priority queue before messages having lower calculated priority levels, and wherein the order the message is de-queued from the first priority queue is different than a first-in-first-out (FIFO) order;
   expanding distribution group recipients corresponding to the message;
   re-calculating the priority level for the message based upon the expanded distribution group recipients;
   placing the message in a second priority queue;
   de-queuing the message from the second priority queue based upon the re-calculated priority level for the message, wherein messages having higher re-calculated priority levels are de-queued from the second priority queue before messages having lower re-calculated priority levels; and
   delivering the message.

2. The method of claim 1, wherein receiving the message comprises receiving the message from an e-mail client.

3. The method of claim 1, wherein receiving the message comprises receiving the message from a message server.

4. The method of claim 1, wherein calculating the priority level for the message comprises calculating the priority level based upon direct characteristics of the message.

5. The method of claim 1, wherein calculating the priority level for the message comprises calculating the priority level based upon direct characteristics of the message, the direct characteristics comprising a size of the message.

6. The method of claim 1, wherein calculating the priority level for the message comprises calculating the priority level based upon direct characteristics of the message, the direct characteristics comprising a presence of a specific attachment type to the message.

7. The method of claim 1, wherein calculating the priority level for the message comprises calculating the priority level based upon direct characteristics of the message, the direct characteristics comprising an authentication level of a sender of the message.

8. The method of claim 1, wherein calculating the priority level for the message comprises calculating the priority level based upon direct characteristics of the message, the direct characteristics comprising a number of recipients of the message.

9. The method of claim 1, wherein calculating the priority level for the message comprises calculating the priority level based upon direct characteristics of the message, the direct characteristics comprising whether a recipient of the message comprises a distribution group.

10. The method of claim 1, wherein calculating the priority level for the message comprises calculating the priority level based upon direct characteristics of the message, the direct characteristics comprising whether the message is "fresh" verses "delayed".

11. The method of claim 1, wherein calculating the priority level for the message comprises calculating the priority level based upon direct characteristics of the message, the direct characteristics comprising whether the message is being aggregated from a secondary account verses a regular message.

12. The method of claim 1, wherein calculating the priority level for the message comprises calculating the priority level based upon aggregated characteristics of the message.

13. The method of claim 1, wherein calculating the priority level for the message comprises calculating the priority level based upon aggregated characteristics of the message, the aggregated characteristics comprising a sender threshold comprising one of the following: a number of recipients, a number of messages sent, or a total size of messages sent.

14. The method of claim 1, wherein calculating the priority level for the message comprises calculating the priority level based upon aggregated characteristics of the message, the aggregated characteristics comprising tenant organization activity in a given time interval in a multi-tenant e-mail system.

15. The method of claim 1, wherein calculating the priority level for the message comprises calculating the priority level based upon aggregated characteristics of the message, the aggregated characteristics comprising aggregated usage of a specific resource by a sender/tenant.

16. The method of claim 1, wherein calculating the priority level for the message comprises calculating the priority level based upon aggregated characteristics of the message, the aggregated characteristics comprising a number of messages recently delivered to recipients of the message.

17. The method of claim 1, wherein delivering the message comprises delivering the message to a recipient e-mail box.

18. The method of claim 1, wherein calculating the priority level for the message comprises calculating the priority level based upon direct characteristics of the message, the direct characteristics comprising whether the message is one of sent to or sent from a user who is paying for e-mail service verses receiving the e-mail service free of charge.

19. A computer storage device that stores a set of instructions which when executed perform a method for providing prioritization, the method executed by the set of instructions comprising:
  providing a plurality of processing states in series, each of the plurality of processing states having a respective corresponding priority calculator;
  providing a plurality of priority queues respectively corresponding to the plurality of processing states; and
  passing a message serially through the plurality of processing states, wherein at each of the plurality of processing states, the message is re-prioritize by the respective corresponding priority calculator and saved in a respective corresponding priority queue, wherein higher-priority messages are de-queued from respective corresponding priority queues before lower-priority messages, and wherein the message is de-queued from the respective corresponding priority queue in a different order than a first-in-first-out (FIFO) order.

20. A system for providing prioritization, the system comprising:
  a memory storage; and
  a processing unit coupled to the memory storage, wherein the processing unit is operative to:
    calculate a priority level for a message, the calculated priority level for the message being based upon at least one of the following: at least one direct characteristic of the message or at least one aggregated characteristic of the message;
    place the message in a first priority queue;
    de-queue the message from the first priority queue in an order based upon the calculated priority level for the message, wherein messages having higher calculated priority levels are de-queued from the first priority queue before messages having lower calculated priority levels, and wherein the order the message is de-queued from the first priority queue is different than a first-in-first-out (FIFO) order;
    expand distribution group recipients corresponding to the message;
    re-calculate the priority level for the message based upon the expanded distribution group recipients;
    place the message in a second priority queue;
    de-queue the message from the second priority queue based upon the re-calculated priority level for the message, wherein messages having higher re-calculated priority levels are de-queued from the second priority queue before messages having lower re-calculated priority levels; and
    deliver the message.

* * * * *